UNITED STATES PATENT OFFICE.

ALBERT EDWARD KELLAM, OF LEICHHARDT, NEAR SYDNEY, NEW SOUTH WALES, AUSTRALIA.

MANUFACTURE OF PAINTS.

1,408,091. Specification of Letters Patent. Patented Feb. 28, 1922.

No Drawing. Application filed July 3, 1919. Serial No. 308,372.

*To all whom it may concern:*

Be it known that I, ALBERT EDWARD KELLAM, subject of the King of Great Britain and Ireland, residing at 272 Flood Street, Leichhardt, near Sydney, New South Wales, Australia, have invented certain new and useful Improvements in the Manufacture of Paints, of which the following is a specification.

The costliness and scarcity of linseed oil has rendered it necessary in the trade of paint manufacture to provide an effective substitute for it as a paint vehicle. Solutions of tarry and bituminous products have been used as black or dense dark paints or varnishes, but for the manufacture of paints of lighter color, linseed oil or soy bean oil, which is also scarce and costly, is relied on.

Mineral oils are not suitable for paint vehicles if used with paint bases in the same manner as oxidizable vegetable oils such as linseed oil and soy bean oil. I have discovered, however, that a certain range of mineral oil products obtainable by destructive distillation of coal may be used for that purpose with practical success, when associated with paint bases and vegetable oily substances, and that paints of middle tints may be thus manufactured at a relatively low cost.

The present invention relates to the manufacture of paints in various tints other than substantially white or black or dense heavy colors, such as may be made by loading light bituminous varnish with earthy and other pigments. According to this invention paint is manufactured with a mineral oil vehicle of relatively low value associated with a limited quantity of an oxidising oil, a low proportion of a saponifiable metallic pigment, a coloring body, and a resinous substance.

This paint may be applied over bitumenised and tarred surfaces, as, for instance, on "ready roofing," and its natural color finish is not affected by the bituminous or tarry matter as is the case with paints made up in the usual way on linseed oil and soy bean oil.

In carrying out my invention, I use the creosote oil fraction of the destructive distillation of coal tar which comes over within the temperature range 230°–270° C. In (say) 160 gals. of this oil whilst heated up to about 100° C. I dissolve about 8 cwt. of resin. In (say) 20 gals. of boiled linseed oil or soy bean oil I grind about 2 cwt. of white lead (carbonate or basic sulphate) or zinc oxide or a mixture of any two or all three of these substances, and add thereto an appropriate quantity of an earthy or an oxidized metallic pigment or mixture thereof, as for instance, a yellow or red earth oxide or a calcined oxide such as rouge, and add thereto sufficient of the creosote-resin vehicle to form a thin paste which can be ground satisfactorily. The quantity and nature of the color pigment necessary will depend upon the color tint of the paint required. The ground base mixture containing the saponified metallic salt and coloring body is then intermixed thoroughly in the creosote-resin liquid. A small proportion of methyl or ethyl alcohol or methylated spirit may be added to augment the drying properties of the product. The relative proportions of creosote oil, vegetable oil, resin, and paint bases above defined are subject to more or less wide variation. The essence of the invention consists in the utilisation of the limited range of tar oils as a paint vehicle, for which purpose said oils are prima-facie not usable.

What I claim as my invention and desire to secure by Letters Patent is:

1. In the manufacture of paints, the combination of a paint base substance of medium tint and an oxidizable agent with oil obtained by destructive distillation of coal tar within a temperature range 230°–270° C.

2. A paint constituted of an oil obtained by the destructive distillation of coal tar within a temperature range 230°–270° C, resin, metallic salts, and medium tint pigmentary substances milled and intermixed.

3. A paint vehicle consisting of an oil obtained by the destructive distillation of coal tar within a temperature range 230°–270° C. endowed with drying properties by associating with oxidizable vegetable oily products and bodied with mineral pigments of medium tints.

4. A paint constituted of an oil obtained by the destructive distillation of coal tar within a temperature range 230°–270° C, an oxidizable vegetable oil, resin, and mineral pigments of medium tint containing saponifiable elements.

5. A paint constituted of the herein named substances, milled and mixed substantially in the manner herein described, viz., 20 gals.

boiled linseed oil, 2 cwt. of zinc oxide, 8 cwt. resin, 160 gals. of creosote oil, and a medium tint body pigment, with a small proportion of a spirit.

6. A paint constituted of the herein named substances, milled and mixed substantially in the manner herein described, viz.: 20 gallons boiled linseed oil; 2 cwt. of zinc oxide; 8 cwt. of resin; 160 gallons creosote oil; and a medium tint body pigment.

In testimony whereof I affix my signature in the presence of two witnesses.

ALBERT EDWARD KELLAM.

Witnesses:
  W. G. HUMPHREYS,
  A. E. MOORE.